United States Patent [19]

Lee

[11] Patent Number: 5,249,847
[45] Date of Patent: Oct. 5, 1993

[54] ECCENTRIC WHEEL OF A BICYCLE

[76] Inventor: Edmond Lee, P.O. Box 63-151, Taichung, Taiwan

[21] Appl. No.: 927,449

[22] Filed: Aug. 7, 1992

[51] Int. Cl.⁵ .......................................... B60B 27/00
[52] U.S. Cl. ................................. 301/105.1; 301/5.1; 301/110.5; 280/229
[58] Field of Search ...................... 280/229; 301/1, 5.1, 301/105.1, 110.5, 111, 113, 118, 119, 120, 121

[56] References Cited

U.S. PATENT DOCUMENTS

| | | | |
|---|---|---|---|
| 883,746 | 4/1908 | Robbins | 280/229 |
| 985,369 | 2/1911 | Robbins | 280/229 |
| 4,917,394 | 4/1990 | Lin | 301/105.1 X |
| 5,002,295 | 3/1991 | Lin | 280/229 X |

Primary Examiner—Russell D. Stormer

[57] ABSTRACT

An eccentric wheel of a bicycle including a wheel body, a pair of tracks formed in parallel in the wheel body, one or more holes formed in each of the tracks, a block slidably engaged between the tracks for supporting a wheel axle of the bicycle, a pair of pins slidably engaged in the block and extendible outwards of the block for engagement with the holes of the tracks, and a spring biased between the pins for biasing the pins outwards to engage with the holes.

12 Claims, 4 Drawing Sheets

ECCENTRIC WHEEL OF A BICYCLE

BACKGROUND OF THE INVENTION (a) Field of the Invention

The present invention relates to an eccentric wheel, and more particularly to an eccentric wheel of a bicycle.

(b) Description of the Prior Art

A bicycle having an eccentric wheel is disclosed in U.S. Pat. No. 4,917,394 to Lin, filed Apr. 28, 1989, entitled "BICYCLE WITH AN ECCENTRIC REAR WHEEL". In this patent, a pinion is rotated in order to adjust the location of the wheel axle supported in a sleeve. However, the pinion is disposed between two plates and can not be easily rotated in such a tiny space, so that the wheel axle can not be easily adjusted.

The present invention has arisen to mitigate and/or obviate the afore-described disadvantages of the conventional eccentric wheel of bicycles.

SUMMARY OF THE INVENTION

The primary objective of the present invention is to provide an eccentric wheel of a bicycle, in which the wheel axle can be easily adjusted.

In accordance with one aspect of the present invention, there is provided an eccentric wheel of a bicycle comprising a wheel body, a pair of tracks formed in parallel in the wheel body and each including at least one hole formed therein, a block slidably engaged between the tracks for supporting a wheel axle of the bicycle, a pair of pins slidably engaged in the block and extendible outwards of the block for engagement with the holes of the tracks, and means biased between the pins for biasing the pins outwards to engage with the holes.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
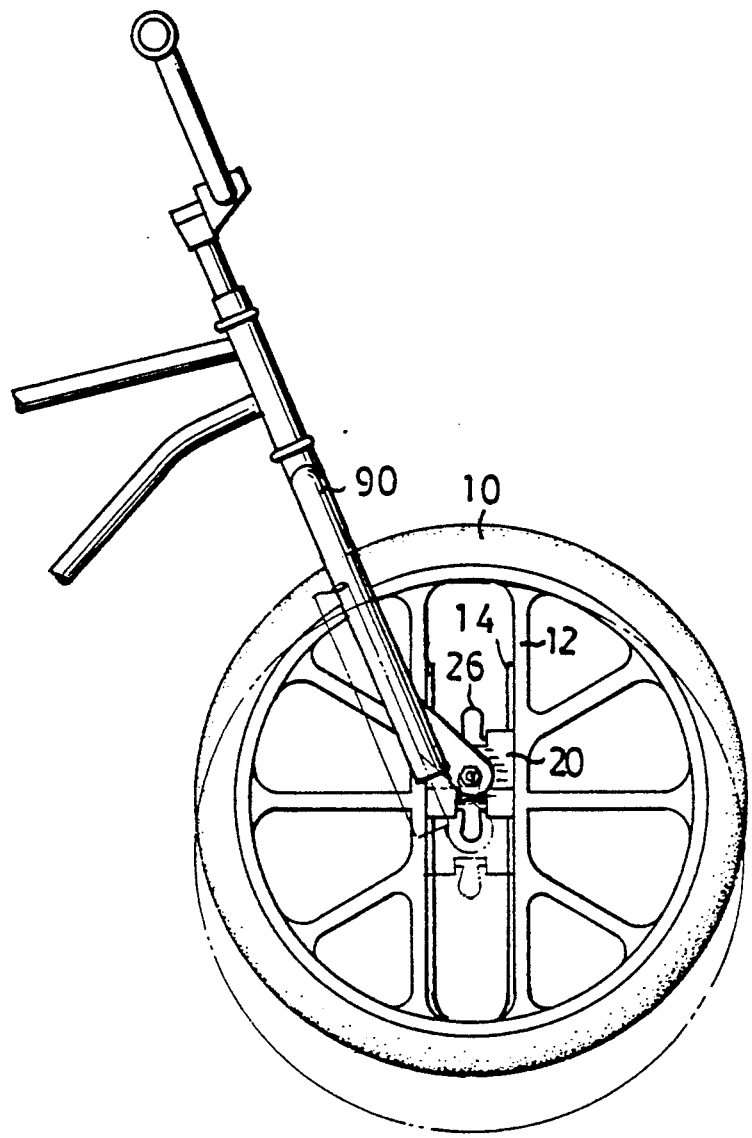
FIG. 1 is a side view of an eccentric wheel of a bicycle in accordance with the present invention, in which the eccentric wheel is supported in the front fork of the bicycle.

Referring to the drawings and initially to FIG. 1, an eccentric wheel of a bicycle in accordance with the present invention comprises generally a wheel body 10, a pair of tracks 12 formed in parallel in the wheel body 10, a block 20 slidably engaged between the tracks 12 and slidable along the tracks 12, and a wheel axle 30 fixed in the block 20 and rotatably supported in the front fork 90 of the bicycle. The block 20 is adjustable along the tracks 12 so that the wheel axle 30 can be adjusted eccentrically.

Figure 2:
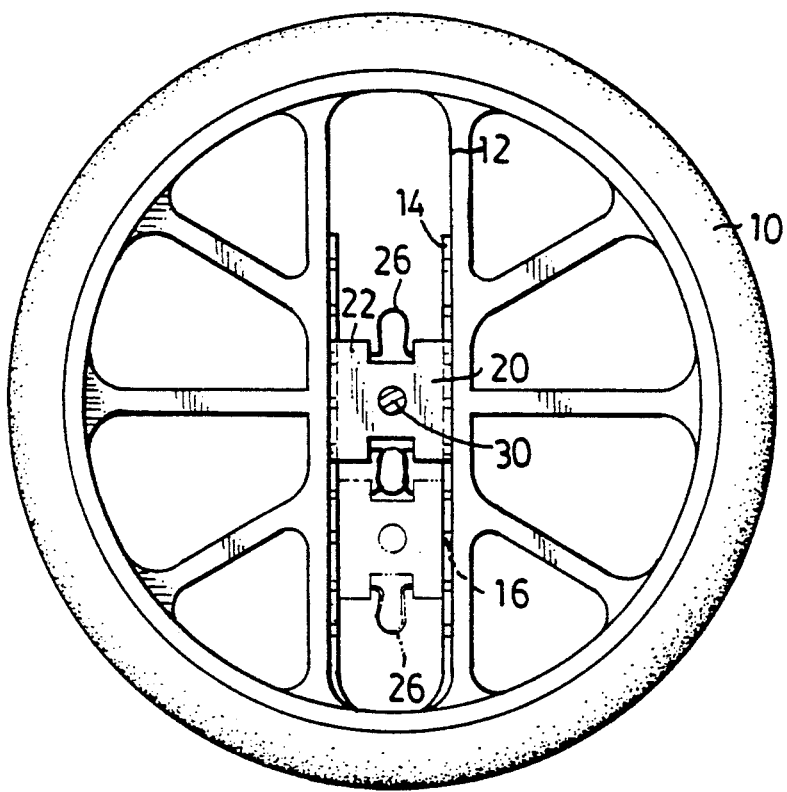
FIG. 2 is an enlarged view of the eccentric wheel.
Figure 3:
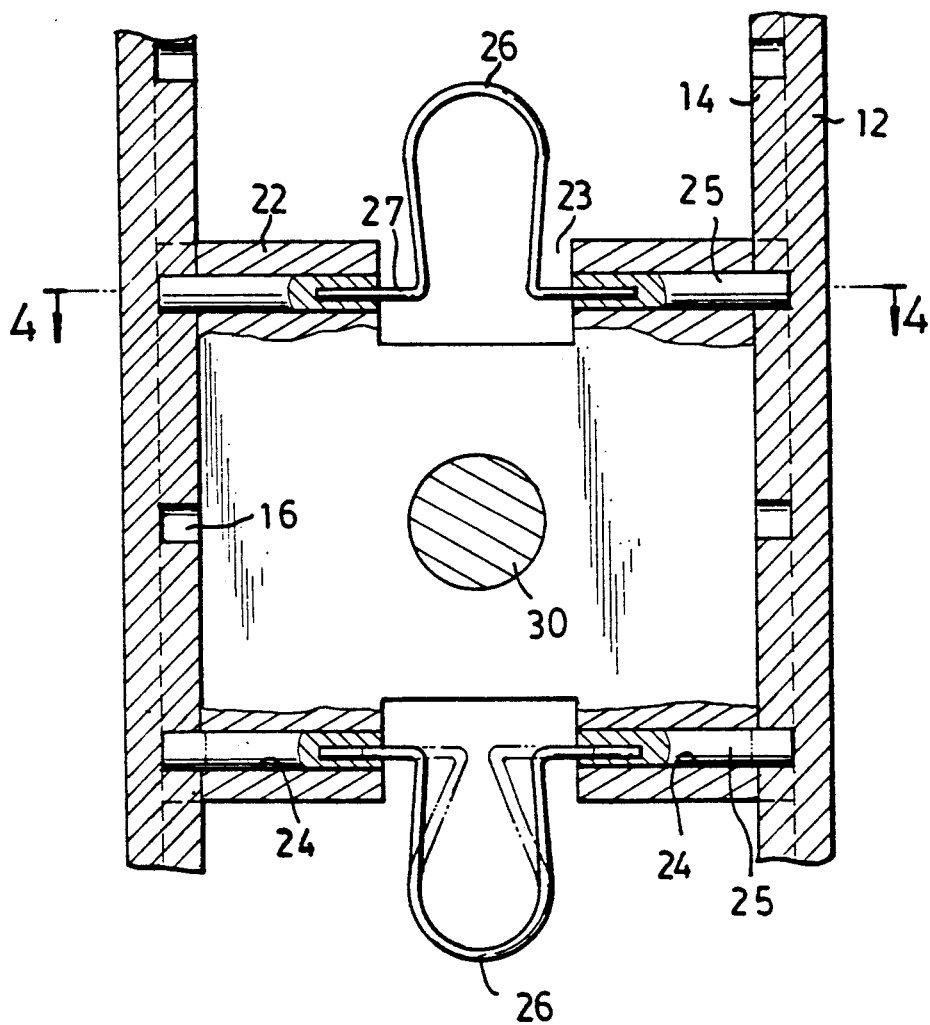
FIG. 3 is a partial cross sectional view of the eccentric wheel.
Figure 4:
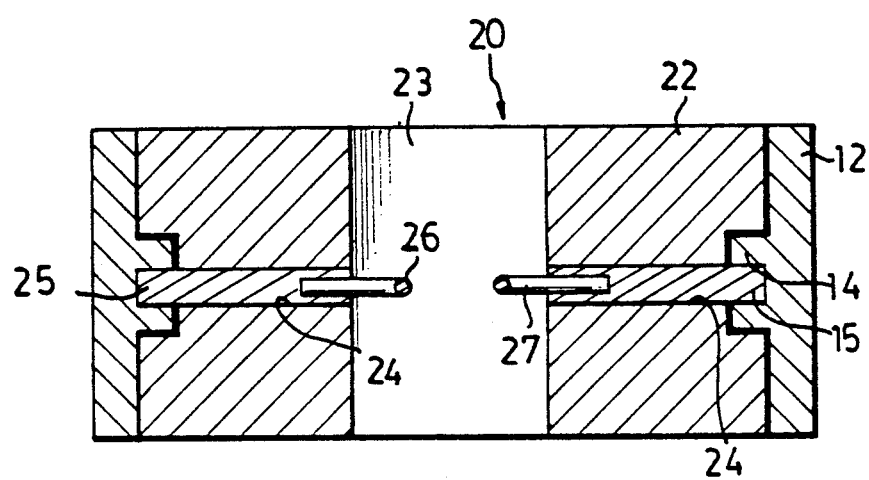
FIG. 4 is a cross sectional view taken along lines 4—4 of FIG. 3.

Referring next to FIGS. 2, 3 and 4, each of the tracks 12 includes a rib 14 longitudinally formed thereon and faced toward the rib 14 of the other track 12, each of the ribs 14 includes a plurality of holes 16 formed therein and spaced with one another. The block 20 includes a pair of recesses 21 oppositely formed therein for slidable engagement with the ribs 14 of the tracks 12 so that the block 20 can be guided to slide along the tracks 12. Two pairs of protrusions 22 oppositely formed on the block 20 and a notch 23 is formed between each pair of protrusions 22. An aperture 24 is formed in each of the protrusions 22 and is perpendicular to the tracks 12, a pin 25 is slidably engaged in each of the apertures 24, and an omega-shaped spring 26 is disposed in the notch 23 and includes two legs 27 fixed to each of two pairs of the pins 25 by such as force-fitted engagement or by welding processes, whereby, the pins 25 are biased outwards to engage with the holes 16 of the ribs 14, and the pins 25 can be disengaged from the holes 16 when the spring 26 is compressed.

It is to be noted that the ribs 14 do not extend along the full length of the tracks 12, best shown in FIG. 2, such that the block 20 can be inserted into place and such that the ribs 14 can be engaged in the recesses 21.

Alternatively, a pair of ribs can be formed on the block 20 and slidably engaged in the recesses formed in the tracks 12 such that the block 20 can also be guided to slide along the tracks 12.

When it is desired to move the block 20 along the tracks 12 in order to adjust the locations of the wheel axle 30, it is only required to compress the springs 26 in order to disengage the pins 25 from engagement with the holes 16 of the ribs 14, such that the block 20 can be easily moved. When the springs 26 are released, the pins 25 are biased outwards by the springs 26 when the pins 25 are aligned with the holes 16, such that the block 20 can be easily retained in place.

It is to be noted that only one pair of the pins 25 with a spring 26 biased therebetween can also achieve the same purposes. However, practically, for safety purposes, two pairs of pins 25 are disposed in the block 20 in order to positively lock the block 20 in place.

Accordingly, the wheel axle of the eccentric wheel in accordance with the present invention can be easily adjusted and can be adjusted in a fast speed.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An eccentric wheel of a bicycle comprising a wheel body, a pair of tracks disposed in said wheel body and arranged in parallel with each other and each including at least one hole formed therein, a block slidably engaged between said tracks for supporting a wheel axle of said bicycle, a pair of pins slidably engaged in said block and extendible outwards of said block for engagement with said holes of said tracks, and means biased between said pins for biasing said pins outwards to engage with said holes.

2. An eccentric wheel according to claim 1, wherein each of said tracks includes a rib formed longitudinally thereon, said block includes a pair of recesses oppositely formed therein for slidable engagement with said ribs of said tracks such that said block is guided to slide along said tracks.

3. An eccentric wheel according to claim 2, wherein said ribs have a length shorter than that of said tracks such that said block is engageable between said tracks.

4. An eccentric wheel according to claim 1, wherein said block includes a pair of protrusions formed thereon with a notch formed therebetween, each of said protrusions includes an aperture formed therein for slidably receiving said pins respectively.

5. An eccentric wheel according to claim 4, wherein said means biased between said pins is a spring disposed in said notch and includes a pair of legs fixed to said pins respectively, whereby, said pins are disengaged from said holes when said spring is compressed.

6. An eccentric wheel according to claim 5, wherein said spring is omega-shaped.

7. An eccentric wheel of a bicycle comprising a wheel body, a pair of tracks disposed in said wheel body and arranged in parallel with each other and each including at least two holes formed therein, a block slidably engaged between said tracks for supporting a wheel axle of said bicycle, a pair of pins slidably engaged in said block and extendible outwards of said block for engagement with said holes of said tracks, and biasing means biased between said pins for biasing said pins outwards to engage with one of said holes of each of said tracks, whereby, said pins are disengaged from said holes when said biasing means is compressed, and are biased outwards to engage with other holes when said pins are aligned with said other holes.

8. An eccentric wheel according to claim 7, wherein each of said tracks includes a rib formed longitudinally thereon, said block includes a pair of recesses oppositely formed therein for slidable engagement with said ribs of said tracks such that said block is guided to slide along said tracks.

9. An eccentric wheel according to claim 8, wherein said ribs have a length shorter than that of said tracks such that said block is engageable between said tracks.

10. An eccentric wheel according to claim 7, wherein said block includes a pair of protrusions formed thereon with a notch formed therebetween, each of said protrusions includes an aperture formed therein for slidably receiving said pins respectively.

11. An eccentric wheel according to claim 10, wherein said means biased between said pins is a spring disposed in said notch and includes a pair of legs fixed to said pins respectively, whereby, said pins are disengaged from said holes when said spring is compressed.

12. An eccentric wheel according to claim 11, wherein said spring is omega-shaped.

* * * * *